United States Patent [19]

Yamamoto et al.

[11] Patent Number: 6,103,858
[45] Date of Patent: Aug. 15, 2000

[54] AQUEOUS DISPERSION OF A BIODEGRADABLE POLYESTER AND ITS USE THEREOF

[75] Inventors: Motonori Yamamoto, Mannheim; Volker Warzelhan, Weisenheim; Ursula Seeliger, Ludwigshafen; Son Nguyen Kim, Hemsbach; Karl-Heinz Schumacher, Neustadt; Rainer Hummerich, Worms; Dieter Bernhard Beimborn, Weisenheim; Udo Pagga, Ludwigshafen, all of Germany

[73] Assignee: BASF Aktiengesellschaft, Ludwigshafen, Germany

[21] Appl. No.: 09/254,972

[22] PCT Filed: Sep. 19, 1997

[86] PCT No.: PCT/EP97/05155

§ 371 Date: Mar. 17, 1999

§ 102(e) Date: Mar. 17, 1999

[87] PCT Pub. No.: WO98/12245

PCT Pub. Date: Mar. 26, 1998

[30] Foreign Application Priority Data

Sep. 20, 1996 [DE] Germany ................. 196 38 686

[51] Int. Cl.⁷ .................................................. C08G 63/02
[52] U.S. Cl. ..................... 528/272; 528/176; 528/271

[58] Field of Search ..................... 528/176, 271, 528/272

[56] References Cited

U.S. PATENT DOCUMENTS

| 3,546,008 | 12/1970 | Shields et al. ............... 528/271 |
| 4,052,368 | 10/1977 | Larson ........................ 528/271 |
| 5,446,079 | 8/1995 | Buchanan et al. ............ 524/41 |
| 5,543,488 | 8/1996 | Miller et al. ................. 528/277 |

FOREIGN PATENT DOCUMENTS

| 2059571 | 7/1923 | Canada . |
| 2057669 | 6/1991 | Canada . |
| 2107716 | 4/1994 | Canada . |
| 332 980 | 9/1989 | European Pat. Off. . |
| 498 156 | 8/1992 | European Pat. Off. . |
| 520 266 | 12/1992 | European Pat. Off. . |
| 591 821 | 4/1994 | European Pat. Off. . |
| 41 21 085 | 1/1992 | Germany . |
| 44 40 858 | 5/1996 | Germany . |
| 2246355 | 1/1992 | United Kingdom . |
| 93/07198 | 4/1993 | WIPO . |

*Primary Examiner*—Terressa M. Boykin
*Attorney, Agent, or Firm*—Keil & Weinkauf

[57] ABSTRACT

The aqueous dispersion of a biodegradable aliphatic-aromatic polyester is useful as a binder for nonwovens and for coating paper.

18 Claims, No Drawings

AQUEOUS DISPERSION OF A BIODEGRADABLE POLYESTER AND ITS USE THEREOF

The present invention relates to a polyester dispersion comprising water and a biodegradable, aliphatic-aromatic copolyester, a process for its preparation and its use as a binder for nonwovens and for coating paper. The present invention further relates to the nonwoven produced using the polyester dispersion of the invention, a process for its production and its use.

The biodegradable copolyesters used in the aqueous polyester dispersion of the invention contain repeat units derived both from aromatic carboxylic acids or derivatives thereof and from aliphatic carboxylic acids and derivatives thereof and are known per se.

For instance, U.S. Pat. No. 5,446,079 and the parallel international application WO 92/09654 describe a linear, random, semicrystalline aliphatic-aromatic copolyester having a limiting viscosity number of about 0.5 to 1.8 dl/g, measured in 60/40 w/w phenol/tetrachloroethane at a concentration of 0.5 g/100 ml and at a temperature of 25° C., the proportion of units derived from aromatic carboxylic acids being from 5 to 65 mol % and the proportion of repeat units derived from aliphatic carboxylic acids being from 95 to 35 mol %, in each case based on the total amount of repeat units derived from carboxylic acids. Not only the biodegradability of such polyesters also their use as moldings, films, etc. are described.

DE-A-44 32 161 describes biodegradable polyesters which are degraded in the natural environment and under the action of microorganisms which are condensed (a) from an aliphatic polyol and an aromatic polyol and an aliphatic polycarboxylic acid or (b) from an aliphatic polyol, optionally alongside an aromatic polyol, and an aromatic polycarboxylic acid as well as simultaneously aliphatic polycarboxylic acid, or (c) from an aromatic hydroxymonocarboxylic acid and an aliphatic hydroxymonocarboxylic acid as monomer components, the units derived from the monomer components being in random or alternating arrangement.

In addition, the biodegradable polyesters used herein are likewise described per se in a number of commonly assigned applications (DE-A-44 40 858, DE-A-44 40 850, DE-A-44 40 837, DE-A-44 40 836, DE-A-195 00 757, DE-A-195 00 756, DE-A-195 00 755, DE-A-195 00 754, DE-A-195 00 185, DE-A-195 05 186).

However, none of these references describe polyester dispersions utilizing these polyesters.

Polyester dispersions and their preparation are likewise known per se (see inter alia U.S. Pat. No. 3,546,008, EP-A-0 332 980 and EP-A-0 498 156). For instance, U.S. Pat. No. 3,546,008 describes fibrous products treated with a size comprising a linear polyester which disperses in water. This polyester is prepared starting from at least one carboxylic acid, at least one diol, provided at least 20% of the diol is polyethylene glycol, and a monomer having an $SO_3M$ group, where M is hydrogen or a metal ion. Copolyesters of the type contemplated herein are not mentioned in this reference. Polyesters derived from carboxylic acid mixtures comprising hexahydroisophthalic acid and from a diol are exemplified. Such polyesters are not biodegradable, however.

EP-A-0 332 980 relates to a process for preparing aqueous polyester dispersions by condensing aromatic dicarboxylic acids or esters with at least one diol to form prepolymers having an acid number from 2 to 8. These prepolymers are subsequently reacted with at least one molecular weight enhancer compound to form polyesters having acid numbers of 40 to 60 and the polyester is dispersed by addition of aqueous mixtures of ammonia and amines in a molar ratio of 10:1 to 1:10 to a polyester melt having a temperature within the range from 150 to 210° C. The reference further relates to the use of these polyester dispersions as sizes for sizing filament warp yarns. The polyesters used in this reference, which are based on aromatic dicarboxylic acids, have excellent mechanical properties, but virtually no biodegradability.

EP-A-0 498 156 describes aqueous polyesters for high solids baking finishes wherein the urethane-, carboxyl- and hydroxyl-functional polyester resin described has a hydroxyl number of 40 to 110 and a urethane group content of 6.5 to 11% by weight. Such polyesters have relatively high tackiness and unsatisfactory mechanical strength and are therefore unsuitable for the applications contemplated in this invention.

Nonwovens suitable for composting are known.

For instance, EP-A-0 591 821 describes a compostable nonwoven bonded with from 5 to 100% by weight, based on the weight of the fiber used, of an addition polymer which has a glass transition temperature of −70 to +40° C. and which is preparable by free-radical polymerization of ethylenically unsaturated monomers comprising 0.5 to 15% by weight of N-alkylolamides of $\alpha,\beta$-monoethylenically unsaturated carboxylic acids having 3 to 10 carbon atoms, acrylamidoglycolic acids, methacrylamidoglycolic acid and/or their ethers, esters or ether-esters with alcohols having up to 12 carbon atoms in an aqueous medium in the presence of a saccharide, and also its preparation and use.

DE-A-41 21 085 describes a biodegradable film or molded article prepared from a composition comprising 100 parts by weight of cellulose fibers having a length of 3 mm or less and a diameter of 50 mm or less, 10 to 600 parts by weight of a thermoplastic resin and 2 to 100 parts by weight of chitosan. Thermoplastic resins mentioned are polyvinyl alcohols, polyurethanes and aliphatic polyesters. Here too the resulting biodegradable articles generally lack mechanical strength, owing to the thermoplastic resins used, and, what is more, are frequently tacky.

Furthermore, Canadian Patent Application CA 2 057 669 describes biodegradable aliphatic polyesters useful as binders for impregnating or coating fibrous fabrics. These polyesters are admittedly, as briefly mentioned above, very readily biodegradable, but generally they possess inadequate mechanical properties and relatively poor processibility.

It is an object of the present invention to provide aqueous biodegradable polyester dispersions possessing excellent mechanical properties combined with good processibility. In addition, the biodegradability, i.e. the time to essentially complete degradation, of the copolyesters used and of the nonwovens treated therewith shall be variable within a considerable time span.

We have found that this object is achieved by a polyester dispersion comprising (A) from 20 to 90% by weight of water, and (B) from 10 to 80% by weight of a biodegradable copolyester (B) containing structural units derived from both aliphatic and aromatic carboxylic acids or derivatives thereof, obtainable by reaction of a mixture comprising (a1) a mixture comprising (a11) from 20 to 95 mol % of adipic acid or of an ester-forming derivative thereof or of a mixture of two or more thereof, (a12) from 5 to 80 mol % of terephthalic acid or of an ester-forming derivative thereof or of a mixture of two or more thereof, (a13) from 0 to 10 mol % of a sulfonate compound or of a mixture of two or more thereof, the sum total of the individual mol %ages being 100, (a2) a dihydroxy compound or an aminoalcohol or a mixture of two or more thereof, the molar ratio of (a1) to (a2) being within the range from 0.4:1 to 2.5:1, (a3) from 0.01 to 10% by weight, based on mixture (a1), of a chain extender from the group consisting of the diisocyanates, divinyl ethers and the 2,2'bisoxazoline of the

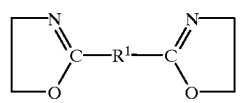

(I)

where $R^1$ is a single bond, a $(CH_2)_q$ alkylene group, where q is 2, 3 or 4, or a phenylene group, or of a mixture of two or more thereof, and (a4) from 0 to 20% by weight, based on mixture (a1), of a compound having at least three groups capable of ester formation or of a mixture of two or more thereof, wherein the repeat units derived from (a11) and (a12) carboxylic acid form a random distribution, the copolyester has a viscosity number within the range from 5 to 450 ml/g (measured in 50/50 w/w o-dichlorobenzene phenol at a concentration of 0.5% by weight of copolyester at 25° C.), and the proportions of components (a13) and (a4) are not zero at the same time.

As used herein "biodegradable" describes the fact that the copolyesters are broken down over a suitable and verifiable period by environmental effects. Degradation is in general hydrolytic and/or oxidative, but predominantly due to the action of microorganisms such as bacteria, yeasts, fungi and algae. Degradation can also take place enzymatically, as described for example by Y. Tokiwa and T. Suzuki in Nature 270 (1977), 76–78. The present invention makes it possible, through appropriate selection of the ratio between repeat units derived from aliphatic carboxylic acids and repeat units derived from aromatic carboxylic acids, to vary the rate of the biological degradation process, i.e. the time to essentially complete degradation of the polyesters used in accordance with this invention. The rule of thumb is that the rate of biodegradation of the copolyesters increases with the proportion of repeat units derived from aliphatic carboxylic acids. Furthermore, the rate of bio-degradation of the copolyesters increases with the proportion of segments having an alternating sequence of repeat units derived from aliphatic and aromatic carboxylic acids or derivatives thereof.

The polyester dispersion of the invention comprises from about 10 to about 80, preferably from about 20 to about 60, in particular from about 20 to about 40,% by weight of solids, i.e. of the copolyester used according to this invention.

The aliphatic dicarboxylic acid which is useful for the purposes of the present invention is adipic acid.

Suitable ester-forming derivatives for the adipic acid are in particular the di-$C_1$-$C_6$-alkyl esters, for example the dimethyl, diethyl, dipropyl, dibutyl, dipentyl and dihexyl esters.

The adipic acid or ester-forming derivatives thereof can be used alone or as a mixture of two or more thereof.

The proportion of adipic acid or its ester-forming derivatives is generally within the range from about 20 to 95, preferably from about 30 to about 70, in particular from about 40 to about 60, mol %, based on the total amount of components (a11) to (a13).

The aromatic dicarboxylic acid used according to the invention is terephthalic acid or an ester-forming derivative thereof. Especially the di-$C_1$-$C_6$-alkyl esters, for example the dimethyl, diethyl, dipropyl, dibutyl, dipentyl and dihexyl esters, are suitable.

The terephthalic acid or its ester-forming derivatives (a12) can be used individually or as a mixture of two or more thereof.

The proportion of terephthalic acid or ester-forming derivatives thereof is generally within the range from about 5 to about 80, preferably from about 30 to about 70, in particular from about 40 to about 60, mol %, based on the total amount of components (a11) to (a13).

The sulfonate compound (a13) used in this invention is customarily an alkali metal or alkaline earth metal salt of a sulfonate-functional dicarboxylic acid or its ester-forming derivatives, preferably alkali metal salts of 5-sulfoisophthalic acid or mixtures thereof, especially the sodium salt. The proportion of sulfonate compound (a13) is within the range from 0 to about 10, preferably from 0 to about 5, in particular from about 3 to about 5, mol %, based on the total amount of components (a11) to (a13).

The sulfonate compounds can be used individually or as a mixture of two or more thereof.

Component (a2) of this invention is a dihydroxy compound or aminoalcohol or a mixture of two or more thereof. In principle, any diols or aminoalcohols known in ester-making can be used.

In general, however, component (a2) is selected from (a21) alkanediols having from 2 to 12 carbon atoms, preferably 4 to 6 carbon atoms, or cycloalkanediols having from 5 to 10 carbon atoms, (a22) polyetherdiols, i.e. dihydroxy compounds containing ether groups, and (a23) aminoalcohols having from 2 to 12 carbon atoms, preferably from 2 to 4 carbon atoms, and also aminocycloalcohols having from 5 to 10 carbon atoms.

Specific examples are ethylene glycol, 1,2-propanediol, 1,3-propanediol, 1,2-butanediol, 1,4-butanediol, 1,5-pentanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, especially ethylene glycol, 1,3-propanediol, 1,4-butanediol and 2,2-dimethyl-1,3-propanediol (neopentylglycol); cyclopentanediol, 1,4-cyclohexanediol, 1,2-cyclohexanedimethanol, 1,3-cyclohexanedimethanol, 1,4-cyclohexanedimethanol and 2,2,4,4-tetramethyl-1,3-cyclobutanediol;

diethylene glycol, triethylene glycol, polyethylene glycol, polypropylene glycol and polytetrahydrofuran, especially diethylene glycol, triethylene glycol and polyethylene glycol, or mixtures thereof, or compounds which have a differing number of ether units, for example polyethylene glycol which contains propylene units and can be obtained for example by conventional polymerization of first ethylene oxide and then propylene oxide. The molecular weight (Mn) of the polyethylene glycols which can be used is generally within the range from about 250 to about 8000, preferably within the range from about 600 to about 3000, g/mol;

4-aminomethylcyclohexanemethanol, 2-aminoethanol, 3-aminopropanol, 4-aminobutanol, 5-aminopentanol, 6-aminohexanol; aminocyclopentanol and aminocyclohexanol; or mixtures thereof.

The dihydroxy compounds or aminoalcohols can be used individually or as a mixture of two or more thereof.

The molar ratio of (a1) to (a2) is generally chosen within the range from about 0.4:1 to about 2.5:1, preferably within the range from about 0.5:1 to about 1.5:1, more preferably within the range from about 0.5:1 to about 1.2:1, especially within the range from about 0.5:1 to about 1:1.

The molar ratio of (a1) and (a2) in the isolated copolyester following the removal of the desired amount of excess component (a2) is within the range from about 0.4:1 to about 1.5:1, preferably within the range from about 0.5:1 to about 1.2:1, especially within the range from about 0.5:1 to about 1:1.

The proportion of chain extenders (a3) is within the range from about 0.01 to about 10, preferably within the range from about 0.05 to about 5, more preferably within the range from about 0.07 to about 4, especially within the range from about 0.1 to about 1%, by weight, based on mixture (a1).

Suitable chain extenders (a3) for use herein are diisocyanates, for example toluylene 2,4-diisocyanate, toluylene 2,6-diisocyanate, 4,4'- and 2,4'-diphenylmethane diisocyanate, naphthylene 1,5-diisocyanate, xylylene diisocyanate, hexamethylene diisocyanate, isophorone diisocyanate and methylenebis(4-isocyanato-cyclohexane), especially hexamethylene diisocyanate; divinyl ethers, for example 1,4-butanediol divinyl ether, 1,6-hexanediol divinyl ether and 1,4-cyclohexane-dimethanol divinyl ether; and also 2,2'-bisoxazolines of the general formula (I)

(IIa)

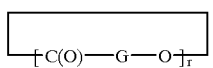
(IIb)

The latter are generally obatinable by the process of Angew. Chem. Int. Edit. 11 (1972), 287–288. Particularly preferred bisoxazolines are those in which $R^1$ is a single bond, a $(CH_2)_q$-alkylene group having q=2, 3 or 4 such as methylene, 1,2-ethanediyl, 1,3-propanediyl, 1,2-propanediyl, 1,4-butanediyl or a phenylene group. Particular preference is given to 2,2'-bis(2-oxazoline), bis(2-oxazolinyl)methane, 1,2-bis(2-oxazolinyl)ethane, 1,3-bis(2-oxazolinyl)propane, 1,4-bis(2-oxazolinyl)butane, 1,4-bis(2-oxazolinyl)benzene, 1,2-bis(2-oxazolinyl)benzene and 1,3-bis(2-oxazolinyl)benzene.

The chain extenders (a3) can also be used as a mixture of two or more thereof.

This invention further contemplates the use of a compound having at least three groups capable of ester formation, (a4), or of a mixture of two or more thereof, in an amount, if present at all, within the range from about 0.01 to about 20, preferably from about 1 to about 10, more preferably from about 3 to about 7, especially from about 3 to about 5%, by weight, based on mixture (a1).

The compounds used as compounds (a4) preferably contain from 3 to 10 functional groups capable of forming ester bonds. Particularly preferred compounds (a4) have from 3 to 6 functional groups of this kind in the molecule, especially from 3 to 6 hydroxyl groups and/or carboxyl groups. Particular preference is given to using tri- and/or tetrafunctional carboxylic acids or derivatives thereof. Specific examples are tartaric acid, citric acid, malic acid, trimethylolpropane, trimethylolethane, pentaerythritol, polyethertriols, glycerol, trimesic acid, trimellitic acid, trimellitic anhydride, pyromellitic acid, pyromellitic dianhydride and hydroxyisophthalic acid.

By including the chain extenders (a3) and/or the compounds (a4) it is possible for example to modify the melt viscosity, the limiting viscosity number or the molecular weight in a desired manner compared with polyesters without added chain extenders (a3) and/or compounds (a4), to raise the limiting viscosity number and the molecular weight accordingly and so vary the mechanical properties of the polyesters in accordance with the particular application.

Here it has to be noted that, according to the invention, at least one component (a13) and/or (a4) has to be present at all times in order that the copolyester may have free acid groups.

If desired, the copolyesters (B) can have as further component trifunctional isocyanate compounds which comprise isocyanurate and/or biuret groups having a functionality of not less than 3.

In a further embodiment, the present invention relates to a polyester dispersion comprising
(A) from 20 to 90% by weight of water, and
(B) from 10 to 80% by weight of a biodegradable copolyester (B1) containing structural units derived from both aliphatic and aromatic carboxylic acids or derivatives thereof,
obtainable by reaction of a mixture comprising
(a1) a mixture comprising
(a11) from 20 to 95 mol % of adipic acid or of an ester-forming derivative thereof or of a mixture of two or more thereof,
(a12) from 5 to 80 mol % of terephthalic acid or of an ester-forming derivative thereof or of a mixture of two or more thereof,
(a13) from 0 to 10 mol % of a sulfonate compound or of a mixture of two or more thereof,
the sum total of the individual mol %ages being 100,
(a2) a dihydroxy compound or an aminoalcohol or a mixture of two or more thereof,
the molar ratio of (a1) to (a2) being within the range from 0.4:1 to 2.5:1,
(a3) from 0 to 10% by weight, based on mixture (a1), of a chain extender from the group consisting of the diisocyanates, dinvinyl ethers and the 2,2'-bisoxazolines of the

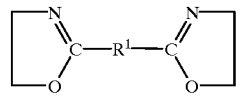
(I)

where $R^1$ is a single bond, a $(CH_2)_q$ alkylene group, where q is 2, 3 or 4, or a phenylene group, or of a mixture of two or more thereof,
(a4) from 0 to 20% by weight, based on mixture (a1), of a compound having at least three groups capable of ester formation or of a mixture of two or more thereof,
(b1) from 0.01 to 100% by weight, based on mixture (a1), of a hydroxycarboxylic acid (b1) defined by the following formula IIa or IIb

(IIa)

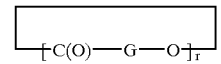
(IIb)

where p is an integer from 1 to 1500, r is 1, 2, 3 or 4, and G is phenylene, $-(CH_2)_n-$, where n is 1, 2, 3, 4 or 5, $-C(R)H-$ or $-C(R)HCH_2-$, where R is methyl or ethyl, or of a mixture of two or more thereof, wherein the repeat units derived from the (cyclo)-aliphatic and aromatic carboxylic acid form a random distribution, the copolyester has a viscosity number within the range from 5 to 450 ml/g (measured in 50/50 w/w o-dichlorobenzene/phenol at a concentration of 0.5% by weight of copolyester at 25° C.), and the proportions of components (a13) and (14) are not zero at the same time.

In the above formula, p is preferably from 1 to about 1000, r is preferably 1 or 2, and n is preferably 1 or 5.

The level of hydroxycarboxylic acid (b1) in the reaction mixture is preferably within the range from about 0.1 to 80% by weight, based on mixture (a1).

Hydroxycarboxylic acid (b1) is preferably glycolic acid, D-lactic acid, L-lactic acid, D,L-lactic acid, 6-hydroxyhexanoic acid, their cyclic derivatives such as glycolide (1,4-dioxane-2,5-dione), D- or L-dilactide (3,6-dimethyl-1,4-dioxane-2,5-dione), p-hydroxybenzoic acid and also their oligomers and polymers such as 3-polyhydroxybutyric acid, polyhydroxyvaleric acid, polylactide (obtainable for example as EcoPLA® (fr. Cargill)) and also a mixture of 3-polyhydroxybutyric acid and polyhydroxyvaleric acid (the latter is obtainable from Zeneca under the name of Biopol®), and the above-defined low molecular weight and cyclic derivatives are used.

It is of course also possible to use mixtures of two or more of the above-defined hydroxycarboxylic acids.

In a further embodiment, the use of cyclic derivatives of the above-described hydroxycarboxylic acids (b1) in the reaction with the biodegradable copolyester used according to the invention results, through a conventional ring-opening polymerization, in copolyesters of the above-defined type which contain block structures consisting of the copolyester (B) used according to this invention which are in each case linked together by at least one hydroxycarboxylic acid unit (b1) (re ring-opening polymerization see Encyclopedia of Polymer Science and Engineering, Vol. 12, 2nd Ed., John Wiley & Sons, 1988, pages 36–41).

Copolyesters whose use is particularly preferred in the present invention have the following composition as regards components (a11), (a12) and (a2), although it has to be taken into account that these copolyesters can not only have sulfonic acid groups but also contain the chain extenders and/or compounds defined as components (a3) and (a4). The parenthetical values following the respective component correspond to the proportion of this component, expressed in mol %:

terephthalic acid (40)—adipic acid (60)—butanediol (100), terephthalic acid (30)—adipic acid (70)—butanediol (100).

The copolyesters used according to the invention are characterized by the following features:

They have a viscosity number within the range from about 5 to 450 ml/g, preferably within the range from about 50 to about 350 ml/g, more preferably within the range from about 100 to about 350 ml/g, especially within the range from about 200 to about 350 ml/g, in each case measured in 50/50 w/w o-dichlorobenzene/phenol at a concentration of 0.5% by weight of copolyester at 25° C.

The copolyesters used according to the invention further possess both hydroxyl and carboxyl end groups.

The hydroxyl number of the copolyesters used according to the invention is within the range from 0 to about 30, preferably within the range from 0 to about 20, in particular within the range from 0 to about 10.

For further details of the (cyclo)aliphatic dicarboxylic acids, aromatic dicarboxylic acids, diols and/or aminoalcohols usable in this invention and also of the further components (a3), (a4) and (b1) reference is made to the commonly assigned patent applications mentioned at the beginning in the discussion of background art and to U.S. Pat. No. 5,446,079, or the parallel Application WO92/09654, incorporated herein by reference for the copolyesters and their preparation described therein.

None the less, the preparation of the copolyesters used according to the invention will now be briefly described.

This preparation of polyesters is known in principle (Sorensen and Campbell, Preparative Methods of Polymer Chemistry, Interscience Publishers, Inc., New York, 1961, pages 111–127; Encyclopedia of Polymer Science and Engineering, Vol. 12, 2nd Ed., John Wiley & Sons, 1988, pages 1–75; Kunststoffhandbuch, Vol. 3/1, Carl Hanser Verlag, Munich, 1992, pages 15–23 (Herstellung von Polyestern); and also the aforementioned patent applications.

For instance, the reaction of (a1)-comprised dimethyl esters of dicarboxylic acids (a11/a12) with component (a2) ("transesterification") and optionally components (a13) and/or (b1) can be carried out at temperatures within the range from about 160 to about 230° C. in the melt at atmospheric pressure, preferably under an inert gas atmosphere.

It is advantageous to prepare the biodegradable copolyester used according to the invention using a molar excess of component (a2), based on the dicarboxylic acids used, for example up to an excess of not more than about 2.5-fold, generally up to about 1.5-fold.

The preparation of the abovementioned copolyester is customarily effected in the presence of suitable conventional catalysts such as metal compounds based on the following elements such as Ti, Ge, Zn, Fe, Mn, Co, Zr, V, Ir, La, Ce, Li and Ca, preferably organometallic compounds based on these metals such as salts of organic acids, alkoxides, acetylacetonates and the like, especially on the basis of Zn, Sn and Ti.

The reaction of components (a1), (a2) and optionally (b1) is generally carried out under reduced pressure or in an inert gas stream, for example under nitrogen, and under continued heating to a temperature within the range from 180 to 260° C. until the desired molecular weight having regard to the desired molar ratio of carboxyl end groups to hydroxyl end groups. Subsequently, (a3) and/or (a4) can generally be added at atmospheric pressure at a temperature within the range from about 50 to about 200° C., preferably under an inert gas, to continue the reaction.

To avoid undesirable degradation and/or side reactions, this process step can, if desired, also be carried out in the presence of stabilizers, the amount of which should be kept as low as possible and is generally within the range from 0.1 to 200 ppm, based on the copolyester. Examples of such stabilizers are phosphorus compounds as described for example in EP-A 13 461, U.S. Pat. No. 4,328,049 and the abovementioned commonly assigned patent applications.

The present invention accordingly further provides a process for preparing the aqueous polyester dispersion of the invention, which comprises (i) preparing a copolyester (B) in a conventional manner by reacting a mixture comprising (a1) a mixture comprising (a11) from 20 to 95 mol % of adipic acid or of an ester-forming derivative thereof or of a mixture of two or more thereof, (a12) from 5 to 80 mol % of terephthalic acid or of a mixture of two or more thereof, (a13) from 0 to 10 mol % of a sulfonate compound or of a mixture of two or more thereof, the sum total of the individual mol %ages being 100 mol %, (a2) a dihydroxy compound or an aminoalcohol or a mixture of two or more thereof, the molar ratio of (a1) to (a2) being within the range from 0.4:1 to 2.5:1, (a3) from 0.01 to 10% by weight, based on mixture (a1), of a chain extender from the group consisting of the diisocyanates, dinvinyl ethers and the 2,2'-bisoxazolines of the

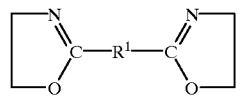

(I)

where $R^1$ is a single bond, a $(CH_2)_q$ alkylene group, where q is 2, 3 or 4, or a phenylene group, or of a mixture of two or more thereof, and (a4) from 0 to 20% by weight, based on mixture (a1), of a compound having at least three groups capable of ester formation or of a mixture of two or more thereof, and performing the reaction in such a way that the repeat units derived from (a11) and (a12) form a random distribution, the copolyester has a viscosity number within the range from 5 to 450 ml/g (measured in 50/50 w/w o-dichlorobenzene/phenol at a concentration of 0.5% by weight of copolyester at 25° C.), and the proportions of components (a13) and (a4) are not zero at the same time;

(ii) neutralizing and dispersing the resulting copolyester (B) in an aqueous medium using a suitable neutralizer.

The present invention further provides a process for preparing the polyester dispersion of the invention, which comprises (i) preparing a copolyester (Bl) in a conventional manner by reacting a mixture comprising (a1) a mixture comprising (a11) from 20 to 95 mol % of adipic acid or of an ester-forming derivative thereof or of a mixture of two or more thereof, (a12) from 5 to 80 mol % of terephthalic acid or of a mixture of two or more thereof, (a13) from 0 to 10 mol % of a sulfonate compound or of a mixture of two or more thereof, the sum total of the individual mol %ages being 100, (a2) a dihydroxy compound or an aminoalcohol or a mixture of two or more thereof, the molar ratio of (a1) to (a2) being within the range from 0.4:1 to 2.5:1, (a3) from 0 to 10% by weight, based on mixture (a1), of a chain extender from the group consisting of the diisocyanates, divinyl ethers and the 2,2'bisoxazoline of the

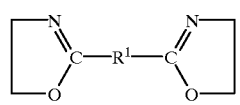

(I)

where $R^1$ is a single bond, a $(CH_2)_q$ alkylene group, where q is 2, 3 or 4, or a phenylene group, or of a mixture of two or more thereof, and (a4) from 0 to 20% by weight, based on mixture (a1), of a compound having at least three groups capable of ester formation or of a mixture of two or more thereof, (b1) from 0.01 to 100% by weight, based on mixture (a1), of a hydroxycarboxylic acid (b1) defined by the following formula IIa or IIb

(IIa)

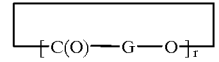

(IIb)

where p is an integer from 1 to 1500, r is 1, 2, 3 or 4, and G is phenylene, —$(CH_2)_n$—, where n is 1, 2, 3, 4 or 5, —C(R)H— or —C(R)HCH$_2$—, where R is methyl or ethyl, or of a mixture of two or more thereof, and performing the reaction in such a way that the repeat units derived from the (cyclo)aliphatic and aromatic carboxylic acid form a random or alternating distribution, the copolyester has a viscosity number within the range from 5 to 450 ml/g (measured in 50/50 w/w o-dichlorobenzene/phenol at a concentration of 0.5% by weight of copolyester at 25° C.), and the proportions of components (a13) and (a4) are not zero at the same time;

(ii) neutralizing and dispersing the resulting copolyester (B1) in an aqueous medium using a suitable neutralizer.

In the two processes of the invention, the preparation of copolyester B or copolyester B1 in step (i) is carried out as extensively discussed above.

Thereafter the copolyester obtained as per step (i), generally as a hot melt having a temperature within the range from about 150 to about 230° C., is admixed with an aqueous solution or dispersion of a neutralizer. The amount of neutralizer added is chosen so that the neutralizer is able to effect partial or complete neutralization of the acid groups, "partial neutralization" in the context of the present invention meaning a degree of neutralization within the range from about at least 70% of the carboxyl groups present in the copolyester. Water is generally added in such an amount as to produce an aqueous polyester dispersion having a polyester content within the range from about 10 to about 80% by weight, preferably within the range from about 20 to about 60% by weight. The neutralizer can also be added in excess.

As stated above, the mixture of water and a neutralizer is added to the polyester melt at temperatures of the melt within the range from about 150 to about 230° C., preferably at temperatures from about 150 to about 200° C. However, the temperature should not be below 150° C., since otherwise there is a risk of not obtaining a fine dispersion of the polyester in water. The aqueous polyester dispersion can also be prepared from the melt by first slowly adding up to about half the amount of water required, then adding the neutralizer and finally adding the rest of the water. As the water, or mixture of water and neutralizer, is added to the melt, the temperature thereof decreases.

On completion of the addition of the neutralizer/water mixture, the temperature of the resulting polyester dispersion is generally within the range from about 70 to about 100° C. The polyester dispersion obtained in this way is then stirred for from 2 to 12, preferably from 4 to 6, hours, optionally at an elevated temperature of up to 95° C., and then cooled down to ambient temperature.

The neutralizer used can in general be a traditional neutralizer. Specific examples are ammonia, triethylamine, triethanolamine, monoethanolamine, diethanolamine, N-methyldiethanolamine, morpholine, N-methylmorpholine, 2-amino-2-methyl-1-propanol and mixtures of two or more thereof. Preference is given to using monoethanolamine, diethanolamine, N-methylmorpholine, methyldiethanolamine and ammonia. Alkali metal hydroxides such as, for example, sodium hydroxide of potassium hydroxide can also be used, but are less preferable.

It is further possible, on completion of the dispersing, to distil some of the water back out in order that the solids content may be maximized.

Furthermore, on completion of step (i), the resulting melt can first be admixed with a suitable organic solvent, for example methyl ethyl ketone, tetrahydrofuran or acetone, and the polymer dissolved therein, then, as per step (ii), admixed with a neutralizer and water to neutralize and disperse and subsequently subjected to a vacuum distillation to distil the organic solvent, which should be water-miscible or at least water-dispersible, back out, if desired together with excess water.

The process of the invention affords aqueous polyester dispersions having a solids content from about 10 to about 80% by weight, preferably from about 20 to about 60% by weight.

In addition, the present invention provides for the use of the above-described polyester dispersions as binders for biodegradable nonwovens, as coatings for paper and as spray mulch.

Suitable materials for nonwoven base webs are fibers which are biodegradable. These are generally fibers having a diameter from about 0.002 to about 0.1 mm, preferably from about 0.01 to about 0.05 mm, which can usually be ascertained with the aid of electron micrographs.

In general, the fibers used are natural fibers of cellulosic origin, such as viscose fibers or pulp fibers, or synthetic fibers, such as aliphatic polyester fibers, for example based on copolymers of 3-hydroxybutyrate, 3-hydroxyvalerate and 4-hydroxyvalerate, as described in EP-A 466 050, or those based on aliphatic dicarboxylic acids, for example adipic acid. In addition, it is also possible to use synthetic fibers based on aliphatic-aromatic polyesters as described herein.

Suitable cellulose fibers are fibers obtained from cellulose, hemicellulose or lignocellulose, obtained from wood, straw, cotton, jute, bamboo or bagasse, and cellulose produced by bacteria.

The formation of webs from the fibers is common knowledge and described for example in Römpp, Chemie Lexikon, Georg Thieme Verlag, Stuttgart—New York, 9th Edition, p. 4450. The fiber webs in question can be random fiber webs or preferably oriented fiber webs with or without mechanical preconsolidation, for example in the form of needling, entangling or stitch bonding.

The fiber webs are bonded using from about 5 to 100, preferably from about 11 or more, especially from about 15 to about 50, more preferably from about 20 to about 35%, by weight, based on the amount of fiber web used, of the copolyester.

The consolidation of the fiber webs using the polyesters is effected according to known methods (as described for example in Ullmann's Encyklopädie der technischen Chemie, 4th Edition, Vol. 23, 1983, pages 738 to 742). The fiber web is customarily contacted or saturated with the polyester dispersion by bath impregnation, foam impregnation, spraying, padding or printing. The dispersion can if necessary be additionally diluted with water or else thickened with customary thickeners to obtain the desired processing viscosity. The treatment of the web with the dispersion is generally followed by an operation of drying and heating the resulting nonwoven fabric. The drying conditions depend on the type of dryer used; the drying temperature is customarily within the range from 100 to 230° C., and the drying/heating is carried out for a period within the range from about 10 s to about 60 min.

The present invention accordingly also provides a nonwoven comprising as binder 5 to 100% by weight, based on the weight of the fibers used, of a copolyester as defined above or of a copolyester prepared by a process as defined above.

In a preferred embodiment, this nonwoven further comprises from 2 to 100% by weight of chitosan, based on 100 parts by weight of the fiber used.

Chitosan is a product obtained by deacetylation of chitin present in the mycelium or shells of crustaceans such as crabs or lobsters. The molecular weight and the final degree of acetylation of chitosan used in the present invention are not subject to specific restrictions. However, for reasons of solubility, a final degree of acetylation of at least 60% is desirable.

As observed above, the amount of chitosan is within the range from 2 to 100% by weight, preferably within the range from 5 to 80% by weight, based on 100 parts by weight of the fibers used. An amount of chitosan outside the aforementioned range is not advantageous, since the wet strength suffers. The at least 5% by weight of binder, based on the weight of the fibers used, are necessary to confer the desired flexibility on the web. Experimental work on webs coated or bonded with chitosan exclusively has shown that such webs are exceedingly rigid and consequently not usable for many applications.

The present invention further provides a process for producing a nonwoven, which comprises contacting the fibers with a polyester dispersion as defined or a polyester dispersion prepared by a process as defined in such an amount that the level of copolyester in the bonded fabric is from 5 to 100% by weight, based on the weight of the fibers used. Of course, it is also possible to use mixtures of two or more of the above polyester dispersions.

To produce the nonwoven of the invention which further comprises chitosan as binder, the process of the invention includes a further step of preparing an aqueous solution of an acidic salt of chitosan and contacting this solution with the fibers before or during or together with the aqueous dispersion of the copolyester.

On completion of the contacting impregnation step, the resulting nonwoven is dried.

Before drying, the nonwoven thus obtained can be additionally shaped, so that it is also possible to produce a shaped article from the nonwoven of the invention, which is subsequently dried. For example, the as-obtained nonwoven can be spread out on a suitable surface such as a glass plate to obtain a shaped article in the form of a free or supported film.

In the practice of the foregoing process for producing the preferred embodiment of the chitosan-comprising nonwoven according to the invention, it is advisable to use chitosan in the form of an acidic salt such as hydrochloride or as a similar inorganic acidic salt or formate, acetate, lactate or as a similar organic acidic salt.

In addition, the nonwoven of the invention may include one or more additives, for example a filler or a dye or a mixture of two or more thereof, in which case not only organic fillers, for example starch, but also inorganic fillers, for example silicon dioxide, are used.

The nonwovens of the invention are notable for good compostability coupled with favorable performance characteristics, especially high mechanical strength. They exhibit, inter alia, good dry strength, high wet strength and a soft hand. It must be considered surprising, especially in relation to the additional use of chitosan as per the preferred embodiment of the nonwovens of this invention, that the addition of a polyester dispersion greatly increases the flexibility of the resulting nonwoven.

The nonwoven of the invention can be used as a compostable film, compostable molding and for manufacturing diapers or wipes.

The invention will now be more particularly described with reference to some examples.

polymer was then dissolved in MEK. After the polymer solution had been cooled down to 40° C., the acid groups of the polyester were neutralized with an appropriate amount of ethanolamine. The solution was then admixed with 1 l of water and vigorously stirred. 200 ml of acetone were added to the resulting dispersion. The acetone and the MEK were then distilled off at 60° C. under reduced pressure.

Viscose nonwovens were impregnated with these dispersions in a dip bath process, dried at 150° C. for 2 minutes and then tested in respect of their application properties.

The results of these tests and the composition of the copolyester obtained (without HDI and PMDA) are shown in Table 1.

TABLE 1

|  | TS mol % | IS mol % | ADS mol % | BD mol % | DEG mol % | Rkr · tr N/50 mm | Rkr · naβ Nm |
|---|---|---|---|---|---|---|---|
| Inv. 1 | 40 | — | 60 | 100 | — | 38 | 13 |
| Inv. 2 | 35 | 5 | 60 | 85 | 15 | 33 | 14 |
| Inv. 3 | 30 | — | 70 | 100 | — | 29 | 12 |
| Acronal ® DS2331X (comp.) | — | — | — | — | — | 39 | 13 |

Key to abbreviations used in the table:
TS: terephthalic acid;
IS: isophthalic acid;
ADS: adipic acid;
BD: butanediol;
DEG: diethylene glycol;
Acronal ® DS2331X designates a commercially available acrylate dispersion marketed by BASF;
Rkr · tr: dry breaking strength (measured according to DIN 53857);
Rkr · naβ: wet breaking strength (measured according to ISO 90733).

INVENTIVE EXAMPLES 1 TO 3 AND COMPARATIVE EXAMPLE

General Method of Polyester Production

To prepare polyesters Inv. 1, Inv. 2 and Inv. 3, the amounts of aromatic dicarboxylic acids, adipic acid and dihydroxy compound specified in Table 1 were introduced into a reaction vessel together with 100 ppm of tetrabutyl orthotitanate (TBOT), the molar ratio between alcohol components and acid component being 1.85. The reaction mixture was heated to a temperature within the range from 170° C. to 190° C. and reacted at that temperature for 3–4 hours. The temperature was then raised to 240° C., and excess dihydroxy compound was distilled off under reduced pressure. The OH number of the copolyester obtained was determined and adjusted to 20 by addition of a dihydroxy compound.

General Method of Dispersion Production

The polyesters Inv. 1 to Inv. 3 prepared by the above general method were melted in a reaction vessel. The resulting polyester melt was admixed with an amount of pyromellitic dianhydride (PMDA) corresponding to the OH number and stirred at 50 rpm. The temperature was slowly raised to 180° C., and hexamethylene diisocyanate (HDI) was added in 0.5 ml increments. The torque was measured. As soon as the torque reached 50% (measured with an RE162 laboratory stirrer from Janke & Kunkel), 300 ml of methyl ethyl ketone (MEK) were added to the melt and the In the above inventive examples (Inv. 1 to Inv. 3), the amount of copolyester applied as binder was 33% by weight, based on the amount of nonwoven used.

The nonwovens consolidated by treatment with the dispersion of the invention had dry and wet strengths similar to those obtained with the dispersion Acronal® DS2331X, which consists of starch and a polyacrylate and is accordingly not biodegradable in respect of the polyacrylate content. In addition, however, they advantageously exhibited biodegradability.

The biodegradability of the polyester dispersions of the invention was also tested.

The following tests were carried out:

Film composting test

Polyester films produced in a thickness of 50 μm from the polyester dispersion Inv. 2 by drying at 80° C. were buried in mature compost at 58° C. and the degradation of the films was assessed by inspection.

The film prepared from the polyester dispersion Inv. 2 was almost completely decomposed after 6 weeks in the compost at 58° C.

$CO_2$ evolution test at 58° C. (conforming to ISO 14852) and aerobic composting test (conforming to ISO/CD 14855).

The dispersion Inv. 2 was tested for biodegradability in the $CO_2$ evolution test at 58° C. This test measures the carbon dioxide produced by the process of biodegradation and the increase in biomass.

The dispersion Inv. 1 was tested for biodegradability or compostability in the aerobic composting test. This test measures the carbon dioxide produced in the course of biodegradation.

The results of the two tests are shown in Table 2.

TABLE 2

|  | TS mol % | IS mol % | ADS mol % | BD mol % | DEG mol % | Biodegradability | Method |
|---|---|---|---|---|---|---|---|
| Inv. 2 | 35 | 5 | 60 | 85 | 15 | 87% ($CO_2$ + biomass) | $CO_2$ evolution test |
| Inv. 1 | 40 | — | 60 | 100 | — | 76% $CO_2$ | Aerobic composting test |

As can be seen from Table 2, almost 90% of the test substance used was converted into $CO_2$ and biomass.

We claim:

1. A polyester dispersion comprising
   (A) from 20 to 90% by weight of water, and
   (B) from 10 to 80% by weight of a biodegradable copolyester (B) containing free acid groups and structural units derived from both aliphatic and aromatic carboxylic acids or derivatives thereof, obtained by reaction of a mixture comprising
      (a1) a mixture comprising
         (a11) from 20 to 95 mol % of adipic acid or of an ester-forming derivative thereof or of a mixture of two or more thereof,
         (a12) from 5 to 80 mol % of an terephthalic acid or of an ester-forming derivative thereof or of a mixture of two or more thereof,
         (a13) from 0 to 10 mol % of a sulfonate compound or of a mixture of two or more thereof,
         the sum total of the individual mol %ages being 100,
      (a2) a dihydroxy compound or an aminoalcohol or a mixture of two or more thereof,
      the molar ratio of (a1) to (a2) being within the range from 0.4:1 to 2.5:1,
      (a3) from 0.01 to 10% by weight, based on mixture (a1), of a chain extender from the group consisting of the diisocyanates, divinyl ethers and the 2,2'bisoxazoline of the

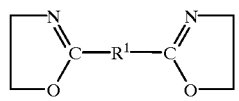
(I)

where $R^1$ is a single bond, a $(CH_2)_q$ alkylene group, where q is 2, 3 or 4, or a phenylene group, or of a mixture of two or more thereof, and
      (a4) from 0.01 to 20% by weight, based on mixture (a1), of a compound having at least three groups capable of ester formation or of a mixture of two or more thereof,
   wherein
      the repeat units derived from (a11) and (a12) form a random distribution, the copolyester has a viscosity number within the range from 5 to 450 ml/g (measured in 50/50 w/w o-dichlorobenzene/phenol at a concentration of 0.5% by weight of copolyester at 25° C.).

2. A polyester dispersion as claimed in claim 1, wherein the copolyester B comprises as further component
   (b1) from 0.01 to 100% by weight, based on mixture (a1), of a hydroxycarboxylic acid (b1) defined by the following formula IIa or IIb

(IIa)

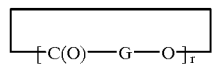
(IIb)

where p is an integer from I to 1500, r is 1, 2, 3 or 4, and G is phenylene, —$(CH_2)_n$—, where n is 1, 2, 3, 4 or 5, —C(R)H— or —C(R)HCH$_2$—, where R is methyl or ethyl, or of a mixture of two or more thereof.

3. A polyester dispersion as claimed in claim 1, wherein the proportion of component (a11) is within the range from 40 to 60 mol % and the proportion of component (a12) is within the range from 40 to 60 mol %, in each case based on the total amount of components (a11) to (a13).

4. A polyester dispersion as claimed in claim 1, wherein (a2) is 1,4-butanediol.

5. A polyester dispersion as claimed in claim 1, wherein (a3) is hexamethylene diisocyanate.

6. A process for preparing a polyester dispersion as claimed in claim 1, which comprises
   (i) preparing a copolyester (B) as defined in claim 1 in a conventional manner by reacting a mixture comprising
      (a1) a mixture comprising
         (a11) from 20 to 95 mol % of adipic acid or of an ester-forming derivative thereof or of a mixture of two or more thereof,
         (a12) from 5 to 80 mol % of terephthalic acid or of an ester-forming derivative thereof or of a mixture of two or more thereof,
         (a13) from 0 to 10 mol % of a sulfonate compound or of a mixture of two or more thereof,
         the sum total of the individual mol percentages being 100,
      (a2) a dihydroxy compound or an aminoalcohol or a mixture of two or more thereof,
      the molar ratio of (a1) to (a2) being within the range from 0.4:1 to 2.5:1,
      (a3) from 0.01 to 10% by weight, based on mixture (a1), of a chain extender from the group consisting of the diisocyanates, divinyl ethers and 2,2'bisoxazoline of the

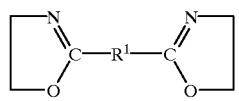

where $R^1$ is a single bond, a $(CH_2)_q$ alkylene group, where q is 2, 3 or 4, or a phenylene group, or of a mixture of two or more thereof, and (a4) from 0.01 to 20% by weight, based on mixture (a1), of a compound having at least three groups capable of ester formation or of a mixture of two or more thereof, and performing the reaction in such a way that the repeat units derived from (a11) and (a12) form a random distribution, the copolyester has a viscosity number within the range from 5 to 450 ml/g (measured in 50/50 w/w o-dichlorobenzene/phenol at a concentration of 0.5% by weight of copolyester at 25° C.);

(ii) neutralizing and dispersing the resulting copolyester (B) in an aqueous medium using a suitable neutralizer.

7. A process for preparing a polyester dispersion as claimed in claim 2, which comprises (i) preparing a copolyester (B1) as defined in claim 2 in a conventional manner by reacting a mixture comprising (a1) a mixture comprising (a11) from 20 to 95 mol % of adipic acid or of an ester-forming derivative thereof or of a mixture of two or more thereof, (a12) from 5 to 80 mol % of terephthalic acid or of an ester-forming derivative thereof or of a mixture of two or more thereof, (a13) from 0 to 10 mol % of a sulfonate compound or of a mixture of two or more thereof, the sum total of the individual mol percentages being 100, (a2) a dihydroxy compound or an aminoalcohol or a mixture of two or more thereof, the molar ratio of (a1) to (a2) being within the range from 0.4:1 to 2.5:1, (a3) from 0.01 to 10% by weight, based on mixture (a1), of a chain extender from the group consisting of the diisocyanates, divinyl ethers and the 2,2'bisoxazoline of the

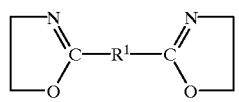

where $R^1$ is a single bond, a $(CH_2)_q$ alkylene group, where q is 2, 3 or 4, or a phenylene group, or of a mixture of two or more thereof, and (a4) from 0.01 to 20% by weight, based on mixture (a1), of a compound having at least three groups capable of ester formation or of a mixture of two or more thereof, (b1) from 0.01 to 100% by weight, based on mixture (a1), of a hydroxycarboxylic acid (b1) defined by the following formula IIa or IIb

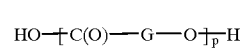

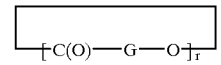

where p is an integer from 1 to 1500, r is 1, 2, 3 or 4, and G is phenylene, $-(CH_2)_n-$, where n is 1, 2, 3, 4 or 5, $-C(R)H-$ or $-C(R)HCH_2-$, where R is methyl or ethyl, or of a mixture of two or more thereof, and performing the reaction in such a way that the repeat units derived from (a11) and (a12) form a random or alternating distribution, the copolyester has a viscosity number within the range from 5 to 450 ml/g (measured in 50/50 w/w o-dichlorobenzene/phenol at a concentration of 0.5% by weight of copolyester at 25° C.);

(ii) neutralizing and dispersing the resulting copolyester (B1) in an aqueous medium using a suitable neutralizer.

8. A process as claimed in claim 6, further comprising dissolving the polyester obtained after step (i) in a suitable organic solvent and removing the same after the neutralizing and dispersing of step (ii).

9. A nonwoven comprising a binder comprising from 5 to 100% by weight, based on the weight of the fibers used, of a copolyester (B) or of a copolyester (B1) or of a mixture of two or more thereof as defined in claim 1.

10. A nonwoven as claimed in claim 1, further comprising from 2 to 100% by weight, based on 100 parts by weight of the fibers used, of chitosan.

11. A process for preparing a nonwoven as claimed in claim 10, which comprises contacting the fibers and a polyester dispersion as defined in claim 1 in a first step in such an amount that the level of copolyester (B) or of copolyester (B1) or of a mixture of two or more thereof in the nonwoven is from 5 to 100% by weight, based on the weight of the fibers used, and, in a further step, preparing an aqueous solution of an acidic salt of chitosan and contacting this solution with the fibers before or after or together with the polyester dispersion in such an amount that the level of chitosan is from 2 to 100% by weight, based on the amount of fibers used.

12. A process for preparing a nonwoven as claimed in claim 10, which comprises contacting the fibers and the polyester dispersion as defined in claim 12 and, in a further step, preparing an aqueous solution of an acidic salt of chitosan and contacting this solution with the fibers before or after or together with the polyester dispersion in such an amount that the level of chitosan is from 2 to 100% by weight, based on the amount of fibers used.

13. A process for producing a nonwoven as claimed in claim 10, which comprises contacting the fibers with a polyester dispersion as defined in claim 1 in such an amount that the level of copolyester (B) or of copolyester (B1) or of a mixture of two or more thereof in the nonwoven is from 5 to 100% by weight, based on the weight of the fibers used.

14. A paper coating comprising as binder a polyester dispersion as defined in claim 1.

15. A spray mulch obtainable from a polyester dispersion as defined in claim 1.

16. A polyester dispersion as defined in claim 1, wherein the component (a4) is comprised in an amount of from 1 to 10% by weight, based on mixture (a1).

17. A process for preparing a polyester dispersion as defined in claim 6, wherein the component (a4) is comprised in an amount of from 1 to 10% by weight, based on mixture (a1).

18. A process for preparing a polyester dispersion as defined in claim 7, wherein the component (a4) is comprised in an amount of from 1 to 10% by weight, based on mixture (a1).

* * * * *

UNITED STATES PATENT AND TRADEMARK OFFICE
CERTIFICATE OF CORRECTION

PATENT NO. : 6,103,858
DATED : August 15, 2000
INVENTOR(S) : Yamamoto et al.

It is certified that error appears in the above-identified patent and that said Letters Patent is hereby corrected as shown below:

Column 16, claim 2,
Line 27, "from 1 to 1500" should be -- from 1 to 1500 --.

Column 18, claim 10,
Line 34, "1" should be -- 9 --.

Column 18, claim 11,
Line 38, "10" should be -- 9 --.

Column 18, claim 12,
Line 51, "10" should be -- 9 --.
Line 52, "12" should be -- 11 --.

Column 18, claim 13,
Line 61, "10" should be -- 9 --.

Signed and Sealed this

Twenty-third Day of October, 2001

Attest:

*Nicholas P. Godici*

NICHOLAS P. GODICI
*Attesting Officer*  *Acting Director of the United States Patent and Trademark Office*